United States Patent [19]
Pruvot et al.

[11] 3,922,000
[45] Nov. 25, 1975

[54] LIQUID-COMPRESSION SUSPENSIONS FOR AUTOMOBILE VEHICLES

[75] Inventors: Francois C. Pruvot; Michel Fayolle, both of Billancourt (Hauts de Seine), France

[73] Assignees: Regie Nationale des Usines Renault, Billancourt (Hauts de Seine); Automobiles Peugeot, Paris, both of France

[22] Filed: Mar. 19, 1973

[21] Appl. No.: 342,504

[30] Foreign Application Priority Data
Mar. 24, 1972 France.............................. 72.10451

[52] U.S. Cl. ............................ 280/124 F; 267/65 D
[51] Int. Cl.² ........................................... B60G 3/14
[58] Field of Search................... 280/124 R, 124 F; 267/65 R, 65 D; 92/12.2

[56] References Cited
UNITED STATES PATENTS

| | | | |
|---|---|---|---|
| 3,319,874 | 5/1967 | Welsh et al.......................... | 92/12.2 |
| 3,547,466 | 12/1970 | Millican............................ | 280/124 F |
| 3,589,933 | 6/1971 | Pitcher............................ | 280/124 F |

Primary Examiner—Leo Friaglia
Assistant Examiner—John A. Carroll
Attorney, Agent, or Firm—Stevens, Davis, Miller & Mosher

[57] ABSTRACT

A suspension system for automobile vehicles in which each vehicles wheel is carried by at least one suspension arm articulated on the chassis of said vehicle by means of a pivotal shaft and driving in rotation two symmetrically-disposed piston-cylinder units in such manner that a force transmitted to said wheel applies pressure on a liquid compressed between said pistons and the bottoms of said cylinders, said liquid communicating with an otherwise closed tank filled with a compressible liquid, the nature and mass of which determine the flexibility of said suspension system, and in which the wheel-suspension cylinder or cylinders of one wheel are rigidly fixed on an entirely closed fluid-tight casing, fixed with respect to said vehicle and traversed in a fluid-tight manner by the pivotal shaft of said suspension arm which drives in rotation the crank-pin or pins receiving said piston rods, said casing being filled with the same fluid as that which fills the space between said pistons and said cylinder bottoms, but at a lower pressure.

16 Claims, 9 Drawing Figures

LIQUID-COMPRESSION SUSPENSIONS FOR AUTOMOBILE VEHICLES

The present invention relates to suspension systems for automobile vehicles, and in particular to suspension systems intended for passenger-carrying vehicles — individual or collective transport.

The invention is particularly applied to vehicles in which comfort is an important feature, and in which the load may represent an important part of the dead weight. It is however quite clear that the invention may have other applications outside the automobile field.

It is known to utilize steel springs as the elastic elements of a suspension. These springs are rigidly fixed, on the one hand to the vehicle body (or to the chassis) and to the axle or to the wheel on the other hand. The advantages of this type of suspension are well known:
 — Low production cost;
 — Simplicity of manufacture.

On the other hand, it has disadvantages which are sometimes considered as inacceptable, mainly for vehicles which carry passengers.

In fact, if a suspension having great flexibility is sought in order to have good comfort, the weight of the springs and their bulk rapidly become inacceptable. In addition, this great flexibility renders rapidly essential a restoration of the trim, that is to say a device enabling the body of the vehicle to occupy a mean position with respect to the ground independent of the weight carried.

These trim restoring devices may be either electro-mechanical, hydraulic or pneumatic. The electro-mechanical trim correctors are generally composed of additional elastic elements put under stress (and this stress depends on the load carried) by a system consisting of an electric motor and a speed-reduction gear.

Each of the wheels of the vehicle (or the wheels of one axle only) may be equipped with a device of this kind. This system is obviously expensive, and it has the same disadvantages of weight and bulk as the traditional spring suspensions (with in addition the extra springs, their compression or tensioning device and the trim detector of the vehicle). The hydraulic trim correctors may utilize an additional spring stressed by a hydraulic motor (jack or linear motor).

Another method employed consists of displacing the fixing point of the spring on the chassis in order to obtain what is known as a suspension with variable flexibility, of which the U.S. Pat. No. 3,547,466 is an example. Contrary to the previous systems, there are no additional springs, but the main springs must be capable of absorbing greater forces; they are therefore heavier and more bulky. The U.S. Pat. No. 3,563,330 is a further example of this.

There has also been proposed a mechanical suspension with pneumatic correction of trim, such as for example in U.S. Pat. No. 3,560,017. These suspensions, in addition to mechanical springs, necessitate pneumatic jacks or equivalent devices which are more or less inflated with compressed air supplied by a compressor. These devices necessitate detectors of body level and a valve system permitting the admission and discharge of the air contained in the jacks. These systems are therefore complicated and bulky, and in addition their reliability is doubtful, since the trim correction jacks are not in general very reliable.

In the devices previously described, it will be noted that the damping of the suspension is provided by damping devices which are entirely separate from those preceding. There are therefore devices for suspension, for trim correction, and for damping.

Suspensions of the pneumatic or hydro-pneumatic type are also known, in which the spring is replaced by a gaseous volume which is more or less compressed by a member fixed to the wheel (or to the axle) of the vehicle. The correction of trim is then effected with constant volume of gas, that is to say there is introduced a certain quantity of gas into the suspension element or which is removed from the said element, depending on the level of the body, or with a constant mass of gas in which there is then varied in the suspension element, the quantity of incompressible fluid (in general oil).

In the first case, the damping is carried out by separate hydraulic damping device; in the second case, the fluid serving for trim corrections can be used for damping.

The system with constant gas volume and the system with constant gas mass have a common disadvantages; they do not in general co-operate in the guiding of the wheels (contrary to mechanical blade-springs for example). The wheels must therefore be guided by other devices. The constant mass systems, which are generally high-pressure systems, have generally only small travels and they are therefore placed close to the pivotal axes of the wheel arms and the forces which they transmit to these shafts may be large.

In addition, all the accumulator systems with gaseous fluid are subjected in France to regulations which necessitate annual examination by the Mines Department when the pressure-volume product of the gas accumulator exceeds a certain value. The accumulators themselves are in several parts and comprise a separating diaphragm between the liquid and the gas. The incompressible fluid which puts the gas under pressure is displaced, during the movements of the wheel, by a piston attached to this latter. The piston slides in a cylinder and the volume comprised between them is hydraulically coupled to the accumulator. A flow-restriction element is sometimes provided between the cylinder and accumulator and plays the part of a damping device.

The trim correction is carried out by a valve which detects the mean position of the wheel or the axle. The said valve is furthermore coupled to a low-pressure tank and a source of fluid at high pressure supplied by a pump driven by the heat engine of the vehicle. It can thus be seen that the number of devices utilized is fairly large. Numerous U.S. Pat. Nos. describe comparable systems; 3,582,106; 3,589,701 3,584,894; 3,589,933; 3,550,992.

Another disadvantage common to the systems with constant mass of gas is that when the vehicle is stopped, the supply of oil being stopped, the leakages cause the vehicle to reduce gradually in height until the suspension is in abutment. To remedy this, it has been tried to put joints on the suspension system. The remedy was not very effective: either the leakages still subsist or alternatively the joints introduce friction which adversely affects a good suspension. Similarly, in this case the joints wear and lose their efficiency.

For suspensions with constant gas volume, the gas is generally contained in completely closed rubber cushions. Fluid-tightness is therefore not a problem but punctures or bursting may be fairly frequent. Furthermore, these cushions working at low pressure may be fairly bulky, and in any case they necessitate a compressor and a gas tank if they work on closed circuit.

Another drawback of all pneumatic or hydropneumatic and mechanical suspension systems is that the elastic element must be connected on the one hand to a member fixed to the wheel of the vehicle, and on the other hand to a member fixed on the body. Now, this is the case for certain hydro-pneumatic or mechanical systems, the suspension elements develop forces much higher than those which act on the wheels since they are arranged on the suspension arms at a shorter distance from the pivot than the wheel. They thus transmit large forces to the body or to the chassis; the structure of the vehicle is further complicated as a result.

It is also known to utilize fluids or compressible plastic or pasty materials as suspension elements. In the case of fluids, the disadvantages are either insufficient compressibility which necessitate a very large compressed volume or a very high pressure — the suspension then being no longer economically advantageous — or, if liquids of high compressibility are used, the viscosity and lubrication properties are inacceptable in practice.

In this case, the construction of the damping device hardly becomes easy, and it is necessary to fall back on independent damping devices. The use of plastic or pasty materials presents less problems as regards fluid-tightness, but it does not resolve the question of damping or trim correction.

The invention is directed to permitting the construction of a suspension, of which the elastic element is a liquid with a low modulus of compressibility.

Another object of the invention is to permit the construction of a suspension, the elastic element of which is a liquid contained in a tank serving as an accumulator, the mass of this liquid being constant and being put under pressure by means of another liquid non-miscible with the first and having a very different density.

Another object is to produce a suspension with trim correction of the vehicle, this trim correction being effected by variation of the mass of the second fluid in the suspension circuit.

Another object is to effect damping by wire-drawing the second liquid in pressure losses which may be laminar or with a thin wall or a combination of the two.

Another object is to produce a suspension in which the liquid serving to transmit to the elastic liquid element the forces produced by the vehicle wheels is put under pressure by a pump having at least as many cylinders as there are separate suspension elements, the said pump being driven by the heat engine of the vehicle or by any other type of engine, and has each of its cylinders in communication with a suspension element through a non-return valve.

Another object is to produce a suspension in which the pump which serves to put the second liquid under pressure has a number of cylinders at least equal to the number of suspension elements, each of the cylinders or sets of cylinders corresponding to a suspension element having its suction valve or valves which may be held open by an electro-magnet which thus prevents the flow from the pump.

Another object is to produce a suspension in which each of the cylinders or sets of cylinders of the pump are fed through a port uncovered by the piston at the end of the suction stroke, the said port being closable by an electro-magnet in order to stop the pumping of fluid.

Another object is to produce a suspension such that the couple acting due to the loads (weights and obstacles) on each of the vehicle wheels is transmitted to a compression element composed of two pistons driven by the wheel shaft in such manner that there is no radial reaction on the wheel-shaft.

Another object is to produce pistons, the fluid-tightness of which is ensured by a joint which is only rendered effective when the vehicle is stopped, preventing the gradual lowering of the vehicle height when stopped, the joint being out of service when the vehicle is in motion.

A further object is to produce a suspension in which each suspension element is put into communication through a calibrated pressure loss device with a tank of fluid which further supplies the pressurizing pump.

Another object is to produce a suspension in which this leakage is interrupted when the vehicle is stopped.

Still a further object is to produce a suspension in which the height of the vehicle with respect to the ground is detected electrically by proximity detectors which control the electro-magnets of the suction valves of the pump.

The invention will now be described by way of example by reference to various forms and constructions shown in the accompanying drawings, in which.

Figure 1:
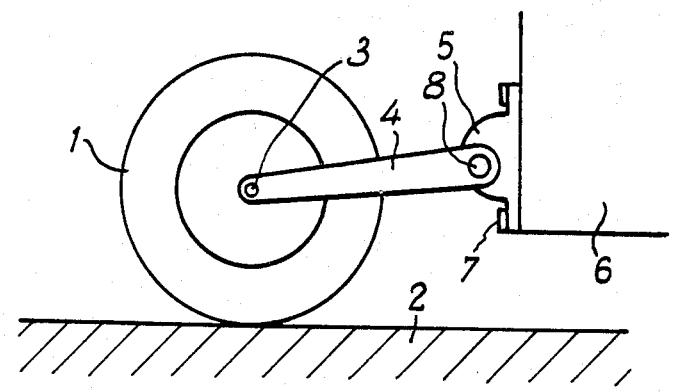
FIG. 1 is a diagrammatic view of an articulation of a vehicle wheel according to the invention.

FIG. 1 shows a vehicle wheel 1 in contact with the ground 2 and rotatably mounted on a shaft 3 rigidly fixed on a suspension arm 4. This arm is in turn rotatably mounted on a support 5 fixed on the vehicle 6 (to the chassis or to the body) by fixing means 7.

A shaft 8 rotating on bearings (not shown) carried by the support 5, is made fast for rotation with the arm 4. This shaft terminates at one of its extremities in a splined portion which drives a beam 10 in rotation by an additional spline 9 formed in the said beam 10. In this latter are formed diametrically in opposition two concave spherical surfaces 11 and 12. These surfaces respectively receive the spherical extremities 13 and 14 of two crank-arms 15 and 16. These two crank-arms have their second extremities respectively terminating in spherical ball-joints 17 and 18.

These two ball-joints come into contact with complementary surfaces 19 and 20 formed in the pistons 21 and 22.

These pistons slide in cylinders 23 and 24 which are fixed to a casing 25.

The casing 25 is fixed to the support 5 of the suspension arm. It is closed in a fluid-tight manner and the shaft 8 passes through it by means of a fluid-tight joint (not shown) which may be of any type, known or not. The space respectively comprised between the pistons 21 and 22 and the cylinders 23 and 24 thus varies when the shaft 8 rotates.

It will be assumed that the ball-joints 13, 14, 17 and 18 always remain in contact with their respective bearing surfaces.

Figure 2:
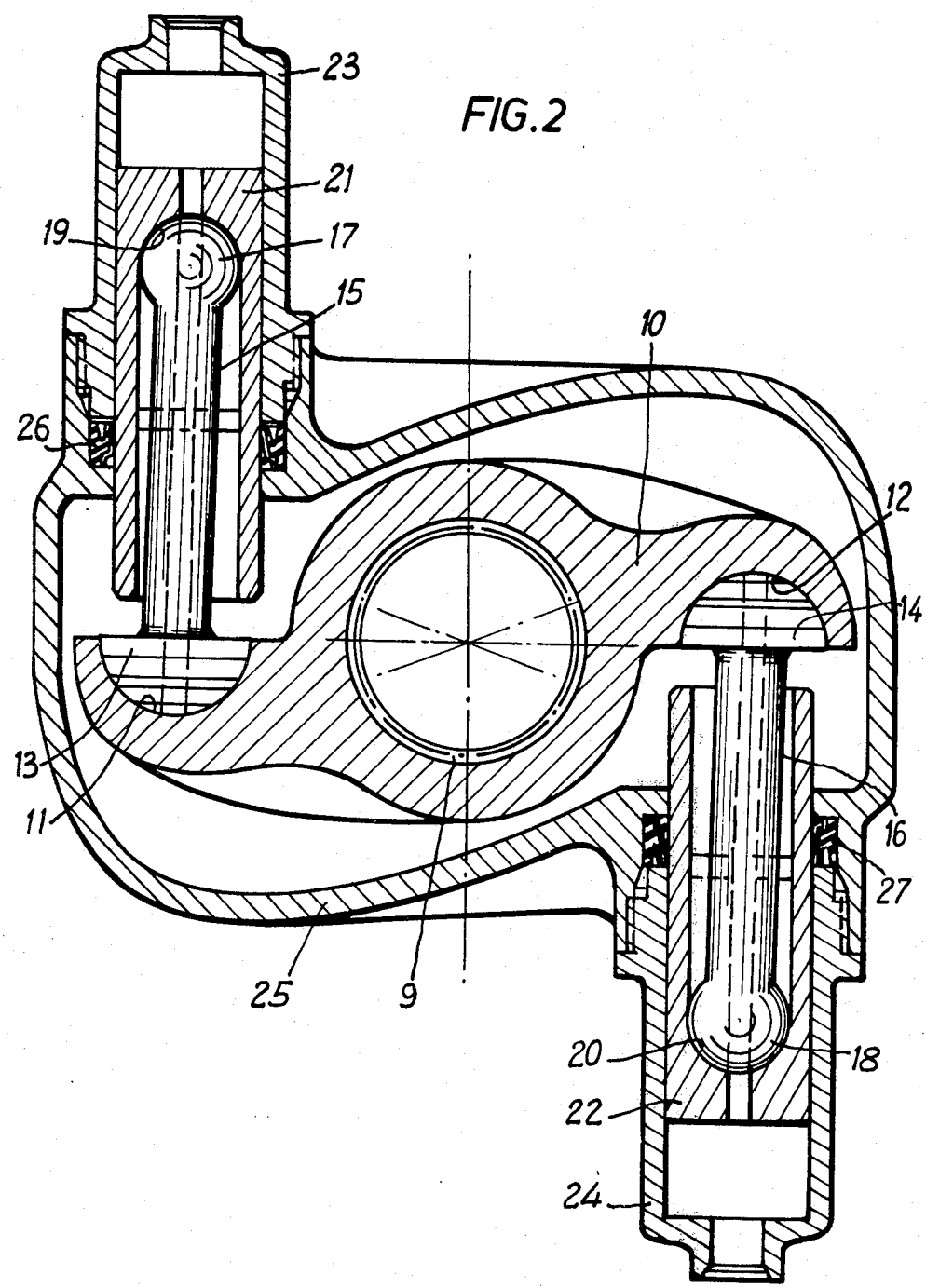
FIG. 2 is a cross-section in elevation of the detail of the articulation.

Between the cylinders 23 and 24 and the pistons 21 and 22 are respectively arranged joints 26 and 27. In FIG. 2, these joints are of the type with lips, but it will be understood later than other types of joints may be employed. In any case, they must be of the high-pressure type.

Figure 3:
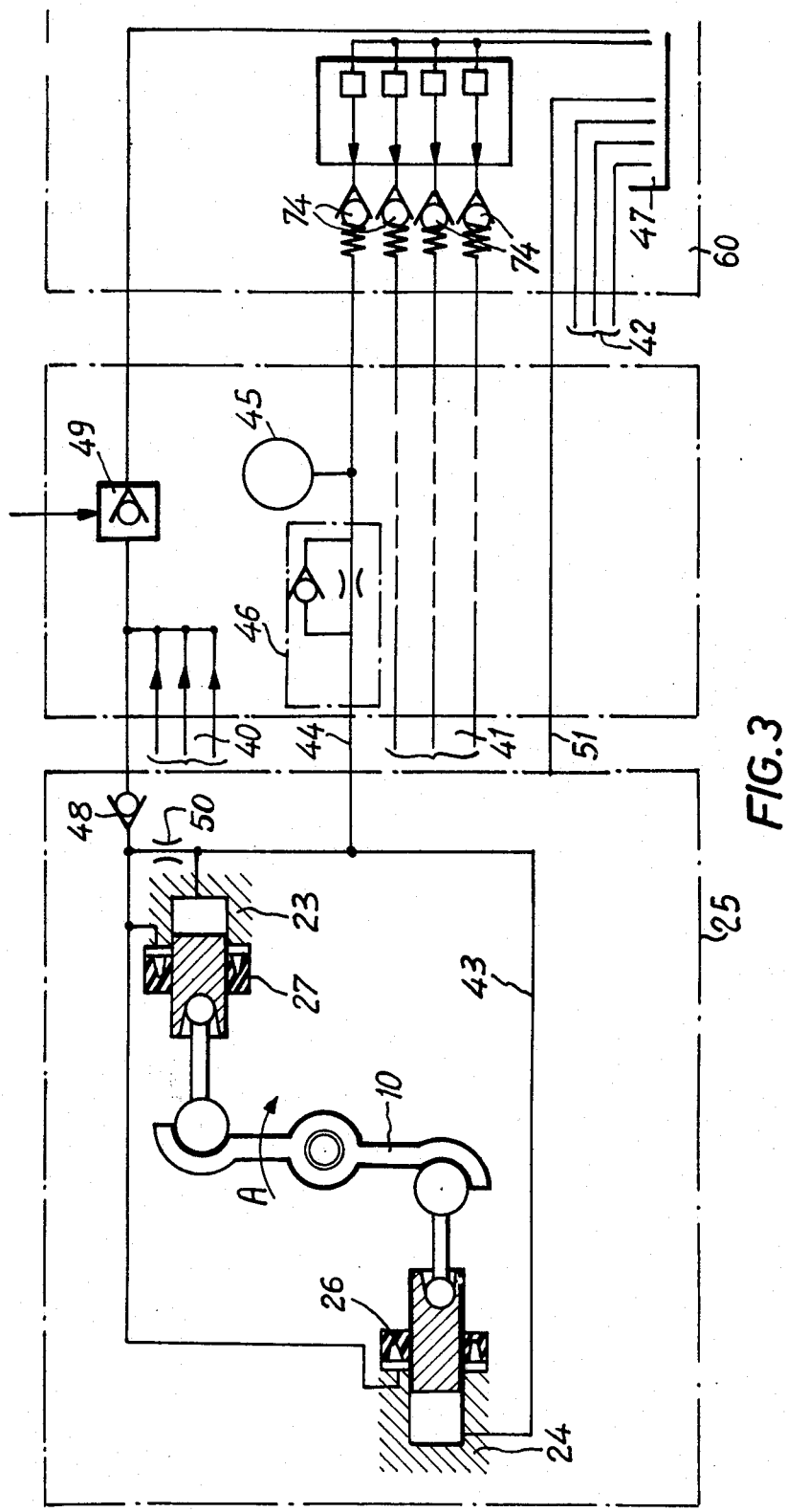
FIG. 3 is a diagram of the control circuit for the said articulation.

FIG. 3 shows a suspension element of this type and its associated circuit which will be described below.

In FIG. 3, there have been shown at 40, 41 and 42 the couplings with the other wheels, the suspension elements of which have not been shown. It can be seen that the two cylinders 23 and 24 are joined to each other by a pipe 43 which is in turn connected by a pipe 44 to a tank 45 of fluid. It is this tank 45 which will receive the compressible liquid serving as the elastic element.

It can already be seen that if the beam 10 is turned in the direction of the arrow A, the fluid will pass out of the chambers of the cylinders, passing through the conduits 43 and 44, according to the volume of the tank 45 and the compressibility of the fluid, its pressure will increase. If the beam 10 is rotated in the opposite direction, the pressure of the fluid will fall.

There has been shown at 46 the element serving as a damping device. This element may be composed of orifices and non-return valves in the usual way, in order to obtain different damping for the inward and outward travel of the wheel. It will be observed that part of the damping may be effected by all or part of the conduit 44. There is then a laminar drop in pressure.

The various tanks 45 may then be arranged together in the same position, for example under the engine bonnet. It can be seen that the chambers in which the joints 26 and 27 are placed are connected to the fluid tank 47 through the intermediary of a non-return valve 48 and a controlled valve 49. There is one non-return valve 48 per suspension element and only one controlled valve 49 per vehicle. The non-return valves of the other suspension elements open between the valves 48 and 49. In addition, the chambers of the suspension pistons are coupled to the same return circuit to the tank on the upstream side of the valve 48, by a pressure-reducing throttle 50.

When the vehicle is in motion, the valve 49 is open and the reducing throttle 50 permits a certain quantity of liquid to pass, which allows the suspension to become lower. Similarly, it can be seen that the chambers of the joints 27 and 26 are normally at the pressure of the tank and the joints are therefore not under pressure on the piston. Their wear will therefore be very small in normal working. The leakage between the piston and the cylinder is collected in the chambers of the joints and sent back to the non-return valve 48.

If the driver stops the engine, the valve 49 closes and the pressure on the upstream side of the valve 48 will become equal to the pressure existing in the suspension element. The same thing applies to the joint chambers which will become filled with fluid at the pressure of the suspension elements. The joints 26 and 27 are then forced into their housings and against the pistons and prevent any leakage.

The non-return valve 48 has the function of preventing the suspension elements carrying the greatest loads, that is to say those in which the highest pressure exists, from being emptied when the vehicle is stopped into those which are less heavily loaded. The valve 49 has been shown as a hydraulic piloting valve, the pivot pressure being supplied by the lubrication circuit of the engine. It is clear that it could equally well be supplied by the pressure of any pump representing the operation of the vehicle: transmission pump, steering assistance pump, etc... There could also be utilized a electro-valve de-energized when the contact of the vehicle engine is switched-off. Many other solutions will be obvious to those skilled in the art.

Figure 4:
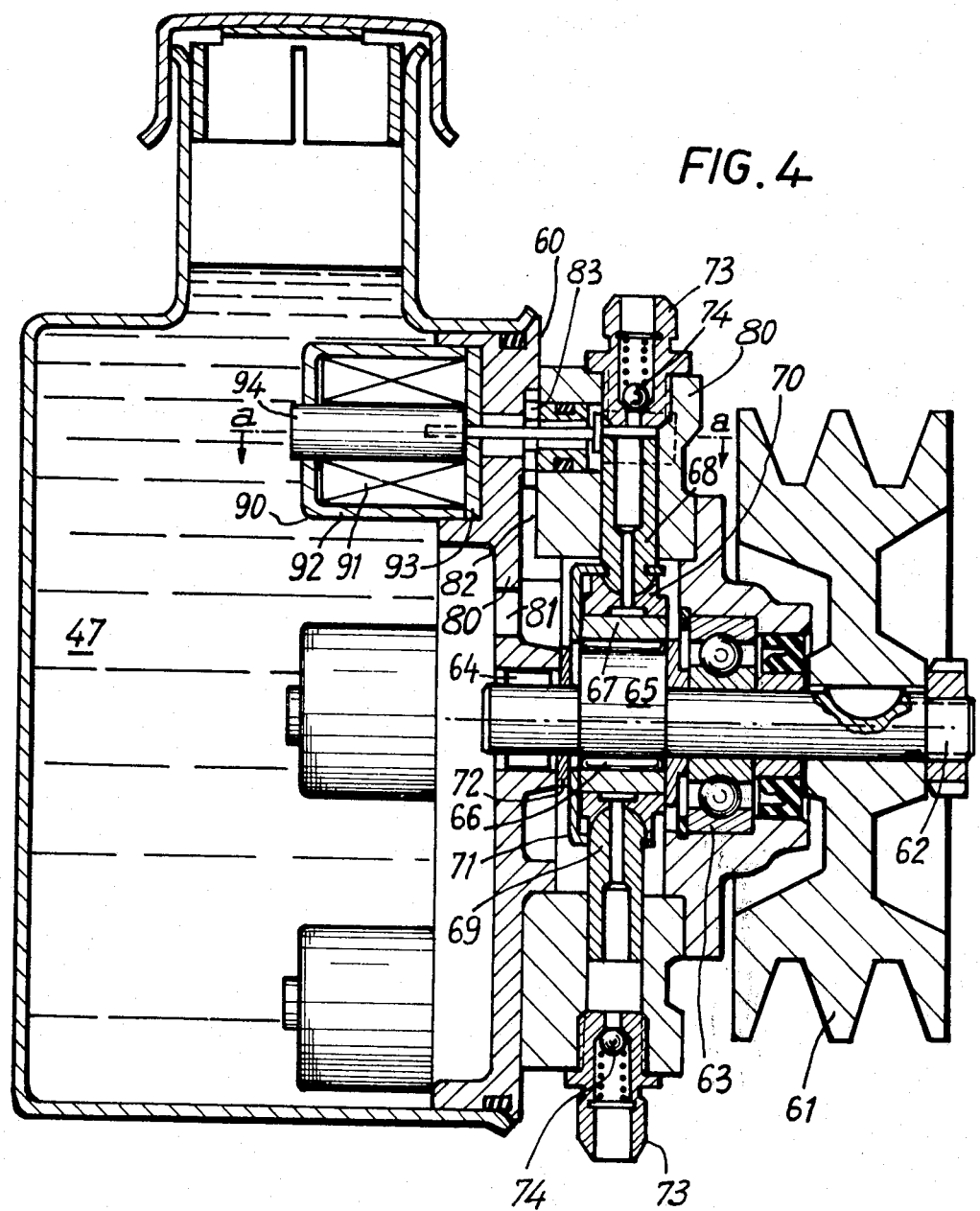
FIG. 4 is a cross-section of a detail of a supply pump.

The interior of the casing 25 is also connected to the tank 47 by a conduit 51. There will now be described, with more particular reference to FIG. 4, the operation of the pump enabling the mass of fluid in the suspension to be increased and thereby permitting the height of the body from the ground to be increased.

The pump will be designated as a whole by the reference No. 60. It is clear that many elements which are included in the pump 60, such as the delivery valves, the tank, etc., could be placed elsewhere than in the pump.

The pump is driven in rotation from a pulley 61 fixed on a shaft 62 guided by two bearings 63 and 64. The pulley is driven by belts which are in turn driven by the vehicle engine. The pump could also be directly integrated in a vehicle member. The shaft 62 carries an eccentric 65 between the bearings 63 and 64. On this eccentric, needles 66 permit a ring 67 to be given a circular motion without rotating on itself.

Around this ring are arranged as many pistons 68 as there are separate suspension elements. These pistons are provided with universal joints 69 at one of their extremities and these are housed in shoes 70. As is well known, these latter are in hydrostatic equilibrium and bear on flat surfaces formed on the ring 67.

The pistons are returned on their shoes and on the ring by sheet-steel staples 71 and 72 (in the case of a pump having 4 pistons in two opposite pairs). These staples are of thin steel sheets and are mounted under stress in grooves formed in the pistons in such manner as to eliminate any play. It can thus be seen that when the shaft 62 is driven in rotation, the pistons 68 will be given an alternating movement of constant travel.

Figure 5:
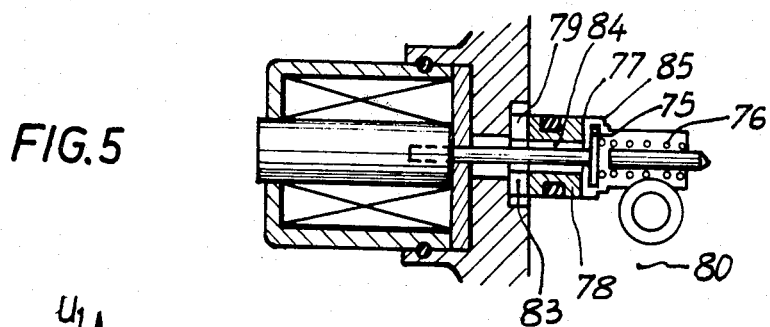
FIG. 5 is a detail view of a suction valve taken in the direction of the arrow A of FIG. 3.

Couplings 73 permit the connection of each of the cylinders to a suspension circuit, the delivery valves 74 enabling the return of oil from the suspension circuit to the pump to be prevented. Each piston also comprises a suction valve 75 from the tank 47. This valve (shown in more detail in FIG. 5) is returned by a spring 76 against a seating 77 formed in one piece 78 mounted in a bore 79 formed in the body of the pump 80.

Oil from the tank 47 can reach the valve through the passages 81, 82, the slots 83 formed in the member 78 and the bore 84 in the member 78. The travel of the valve 75 is limited by a shoulder 85 in the bore 79.

In normal operation, the valve opens when the piston moves towards the centre of the pump and closes when it moves towards the exterior. Under these conditions, the pump 60 would send oil continuously into the suspension circuit and the level of the vehicle would rise incessantly, since the pump must deliver more than the pressure loss device 50.

Provision must thus be made for stopping the delivery of the pump. In order to cancel this flow, it is only necessary for an electro-magnet 90, comprising a coil 91, a magnetic armature 92, 93 and a plunger core 94, to prevent the suction valve 75 from re-closing. The pressure cannot then rise in the cylinder which will no longer deliver and the level of the vehicle will fall.

It is quite clear that many other types of pump may be employed, and the invention is not restricted to the utilization of the type described. In particular, it is possible to use a pump with radial or axial pistons and delivery valves and supplied through ports. The electro-magnets in this case could effectively close the supply ports. The pump will then cavitate and the supply of fluid to the suspension element will then be interrupted.

There will now be described the device for detecting the vehicle height and for controlling the electro-magnets.

The object desired is the constancy of the mean height of the body with respect to the ground.

Figure 6:
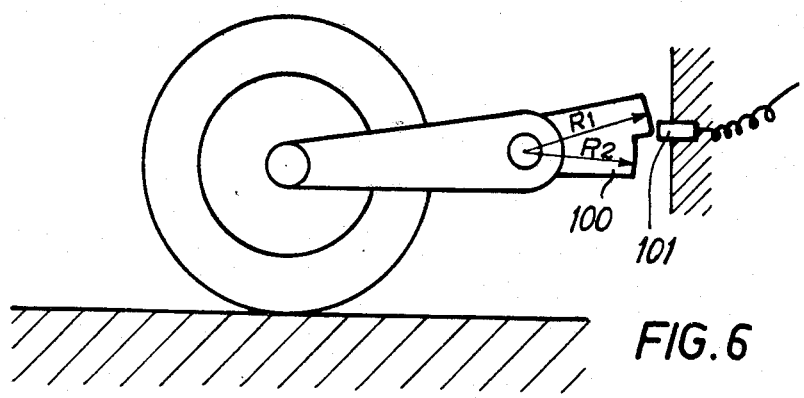
FIG. 6 is a diagrammatic view of a wheel articulation provided with a device for detecting the height of the vehicle.

For that purpose, each suspension arm 4 receives (see FIG. 6) a kind of cam 100 formed by two portions of different radii R1 and R2 centered on the axis of the suspension arm. This cam could also be formed by a single curved portion of variable radius.

In front of the cam 100 is arranged a proximity contact 101 fixed on the body or on the chassis of the vehicle. This proximity detector will be of the all-or-nothing type and will give at its output a signal, the level of which will depend on which part of the cam is facing it, or in other words depending on whether the cam is close to the detector (radius R1) or farther away from it (radius R2). This type of detector is well known.

In the case of a cam having a progressive variation of radius, a detector will preferably be used which gives a signal varying in a continuous manner with the distance which separates it from the cam.

It would of course be possible to employ other types of body height detection; in particular, the suspension arm could be directly coupled to a differential transformer or a potentiometer, or even to simple electric contacts.

Similarly, it would be easy to have only one detector for two wheels of the same axle by coupling the member of which the position is to be detected to an anti-rolling rod or to any other member which gives the mean position of the two wheels.

Figure 7:
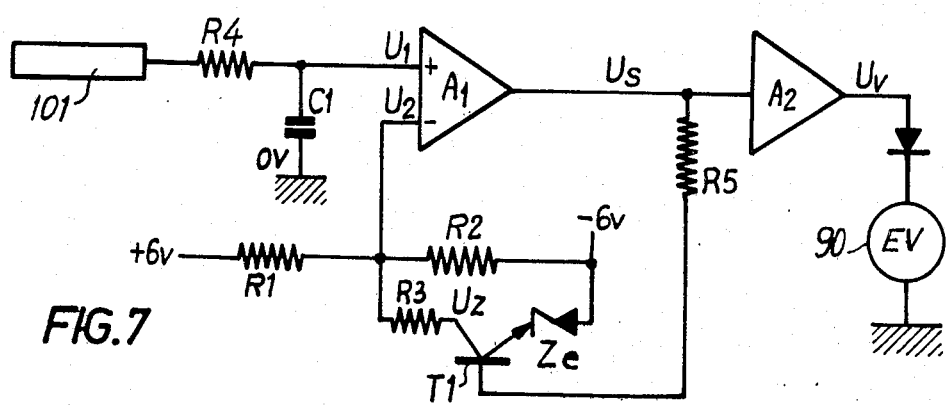
FIG. 7 is an electrical diagram of the height correction control device.

The output of the detector 101 is connected to a filter forming an integrator composed of a resistance R4 and a condenser C1 (see FIG. 7). This filter has the purpose of preparing a voltage corresponding to the mean height of the vehicle body. In fact, the natural frequency of a vehicle tire on the ground is of the order of 12 cycles. That of the vehicle on its suspension is of the order of 1 cycle. It is therefore necessary for the filter to sufficiently reduce the signals due to the movements of the wheels for frequencies of 1 cycle and above, in order that the electro-magnets of the pump are not excited by the oscillations of the wheels caused by deformation of the road surface. The adjustment values of R4 and C1 thus depend on the particular vehicle on which the suspension is to be fitted.

By designating by $U'1$ and $U''1$ the two voltage levels, one corresponding to the maximum permissible mean level of the vehicle and the other to the minimum permissible mean level, the electro-magnet 90 must then be supplied in order that the leakages may allow the vehicle level to fall. When the minimum level is reached, the supply of the electro-magnet is cut-off, and the pump delivers into the suspension element.

FIG. 7 respresents a circuit permitting this operation to be obtained. Following this circuit, the signals supplied by the detector 101 are first filtered by R4-C1 and are then sent to the amplifier A1 in the form of a voltage U1 which is compared with a voltage U2 supplied by a transistor T1 which delivers through a circuit R1, R2, R3 fed by a direct-current voltage for example $-6$ V, $+6$ V, and the base of which is brought through a resistance R5 to the output voltage Us to be amplified. The voltage Us is supplied to an amplifier A2 which feeds a voltage Uv to the electro-magnet 90. The emitter of the transistor T1 is coupled to the $-6$ V terminal by a Zener diode Ze.

Figure 8:
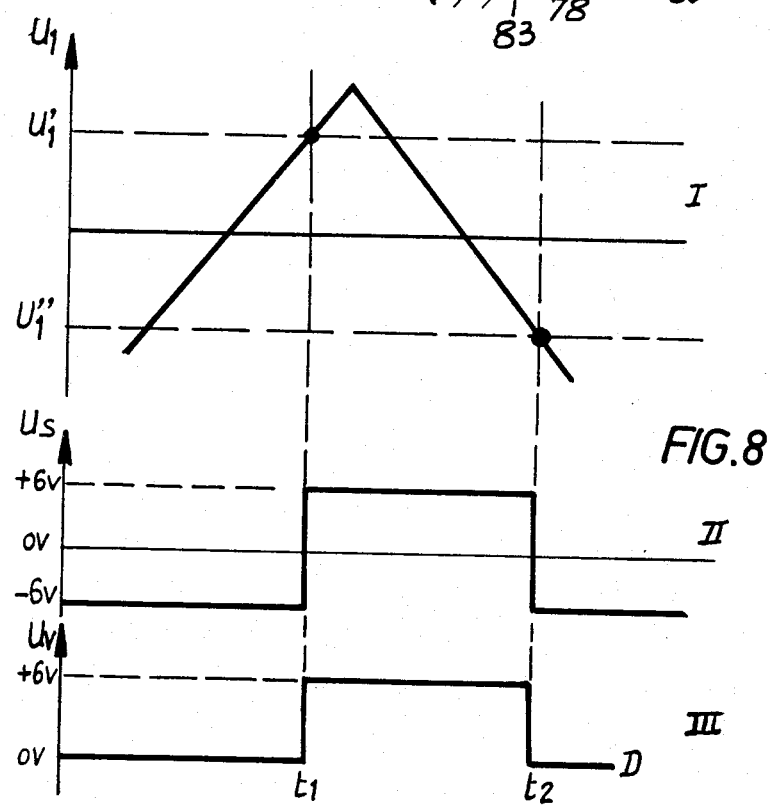
FIG. 8 is a diagram showing the operation of the device of FIG. 7.

When the transistor T1 is blocked, the output voltage Us of the amplifier A1 = $-U$ saturated, and when the transistor T1 is conductive Us = $+U$ saturated. The operation is shown by the diagrams of FIG. 8.

In these diagrams, the $x$ axis is that of time. The diagram I represents the output voltage of the filter. The diagram II represents the variation of the voltage Us at the input of the power amplifier A2 for supplying the electro-magnet 90. The diagram III represents the supply voltage Uv of the electro-magnet 90.

It can be seen that the electro-magnet cancelling the pump delivery is excited when the mean value of the detector voltage reaches the value $U'1$ by increasing values, and it is de-excited when the mean value of the detector voltage reaches the value $U''1$ by decreasing values, or in other words the electro-magnet is excited by the downwardly sloping branch of the curve I.

Assuming the transistor T1 to be blocked, the voltage U1 being less than the value $U'1$, the voltage U2 is a maximum, and the amplifier A1 supplies a negative output voltage Us which keeps the transistor blocked. When U1 reaches the value $U'1$ and exceeds it, the voltage Us becomes positive, the transistor is rendered conductive, the voltage U2 falls and the value of Us produces at the output of the amplifier A2 a voltage Uv which excites the electro-magnet and which holds the valve 75 open.

When U1 reaches the value $U''1$ by decreasing values, the voltage Us becomes negative, the transistor is again blocked, the electro-magnet is de-excited and the valve 75 reverts to its normal operation.

It will finally be noted that the pump 60 may have either a constant or a variable cylinder capacity. It is also possible if it is desired to regulate its flow-rate independently of its speed of rotation, to arrange matters so that the suction valve creates sufficient pressure loss for the pump to cavitate when the heat engine of the vehicle exceeds a given speed. It is also, of course possible, if so desired, to replace the constant leakage system by an electro-valve system which will be excited in order to empty the suspension element and thus to cause the height of the vehicle body to fall.

It has been assumed that the same fluid could be employed in all the elements of the circuits. Now, fluids having a low modulus of compressibility have generally bad lubricating properties. In addition, they are frequently very volatile and have very low viscosity. They are therefore very ill-suited to pumping in a high-pressure pump of the type previously described.

Figure 9:
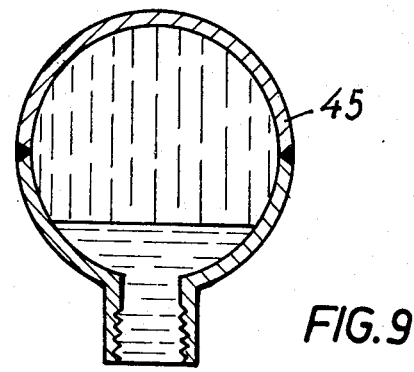
FIG. 9 is a cross-section of a detail of a pressure accumulator.

Two different liquids are therefore employed:

The first, highly compressible, is contained solely in the tank 45 (see FIG. 9). To this end, different liquids are employed such as hydrocarbons, and in particular the normal pentane (n-pentane) or iso-pentane (i-pentane) which have the advantage of being liquid at normal pressure and temperature.

These hydrocarbons have an extremely low cost price. For a vehicle of usual size, the quantity of liquid per wheel may be of the order of 400 to 700 cu.cm., the pressure in the circuit not being required to exceed 300 bars. Other fluids may also be employed such as fluorinated liquids (Freou, Forane) or silicone liquids, but their modulus of compressibility and also their cost are definitely higher.

The modulus of compressibility of an n-pentane at 300 bars is about 6,000 as compared with 14 to 15,000 for a mineral oil.

The viscosity of n-pentane is very low — considerably lower than that of water — and this liquid does not lend itself at all to pumping in a piston pump at high pressure.

As a second liquid there is employed a liquid having an indifferent modulus of compressibility and having a density considerably different from that of the first liquid, in order that they have no tendency to mix in the tank 45.

In addition, the solubility of one liquid in the other must be extremely small. Finally, the second liquid must be suitable for pumping and must have sufficient viscosity for the leakages through the pump pistons and the suspension to be moderate.

There is employed as the second liquid for example a polyglycol, the density of which — close to unity — is considerably greater than that of n-pentane (the closed side of the tank 45 is therefore turned towards the top). Its viscosity may be comparable to that of a standard hydraulic oil as are also its lubrication properties. In addition, this liquid has a viscosity index which is much higher than that of mineral oils and its viscosity will therefore vary considerably less with temperature.

It is easy to prove that with the values of pressure and volume given above, the tanks of liquid under pressure may then be all arranged at the same place without disadvantage (inertia of the column of liquid contained in the coupling piping system) for example, under the bonnet of the vehicle and close to the heat engine. Only the compression elements will then be mounted close to the wheels.

The damping system could also be included in the unit which groups together the tanks under pressure, the valves, etc., and which will be close to the high-pressure pump. In particular, the fact that the said unit may be heated facilitates the production of the pressure loss device 50. In fact, if this latter in order that it should not be too sensitive to temperature variations, must have a thin wall, it would be necessary that it should comprise either a very small hole or a number of holes in series. This technique may be utilized, but there is preferably employed a laminar pressure drop device in which the flow-rate falls as the temperature falls, This has in fact very few disadvantages. When starting-up the vehicle from cold, the level of the body is either too high or correct, and when the driver takes his place in the vehicle, the body falls; it is thus necessary in any case to add fluid to the suspension circuit. If the laminar leakage is then small, that can only have advantages. If the hydraulic unit is under the vehicle bonnet, it then rapidly reaches its normal temperature.

The invention may be applied to all elastic suspension systems and in particular to automobile vehicles with great flexibility and having a trim correction system.

What we claim is:

1. In an automotive vehicle having an engine, a chassis supporting the engine and wheels supporting the chassis, a suspension system comprising:
    at least one movable suspension arm per wheel coupling that wheel to said vehicle chassis;
    a pivot shaft coupled to and rotatably driven by said suspension arm;
    a compressor having a sealed casing fixed with respect to said chassis and having a fluid-tight seal through which said pivot shaft traverses into said casing and further including
        a beam located in said casing and coupled to and rotatable with said pivot shaft,
        two symmetrically disposed piston-cylinder units located in said casing, each unit comprising a cylinder, a piston movable in said cylinder, and a piston chamber defined between the piston and cylinder, the pistons engaging and being driven by opposite end portions of said beam for movement in opposite directions relative to each other;
    a first closed tank containing a first compressible fluid under pressure;
    a second tank containing a second fluid under lower pressure than the fluid in said first tank;
    fluid circuit means coupling said piston chambers to each other and said second fluid in said second tank to said piston chambers, said fluid circuit means also communicating with the fluid in said first tank;
    means communicating the fluid in said second tank with the interior of said sealed casing;
    valve means interposed in said fluid circuit means and coupled to said engine to control the flow of fluid through said fluid circuit means in response to a predetermined engine operating characteristic;
    pump means interposed in said fluid circuit means between said second tank and said piston-chambers to pump fluid under pressure from said second tank to said chambers; and
    sensing means couped to said pump means to control the operation of said pump means as a function of the position of said vehicle relative to the ground.

2. A suspension system according to claim 1, wherein said first fluid has a modulus of compressibility lower than that of said second fluid.

3. An automobile vehicle suspension as claimed in claim 2, in which said compressible fluid contained in said first tank is a hydrocarbon of the pentane type.

4. A suspension system according to claim 2, wherein said first fluid is a compressible liquid and said second fluid is a liquid substantially insoluble and immiscible with said first liquid and having a density substantially different from that of said first liquid, said second liquid having lubricating qualities to ensure sliding movement of said piston in said cylinder and having a viscosity to substantially prevent leakage of said second liquid from said piston chamber.

5. An automobile vehicle suspension as claimed in claim 4, in which said second liquid as a polyglycol.

6. A suspension system according to claim 4, wherein said first liquid is a hydrocarbon of the pentane type.

7. A suspension system according to claim 4, wherein said piston chambers are connected to said second tank through a pressure loss device interposed in said first circuit means.

8. A suspension as claimed in claim 7, in which a fluid-tight joint of the type having lips is provided in a cavity formed between said casing and each cylinder, whereby one of the lips of said fluid-tight joint is in frictional engagement with the corresponding piston, said cavity being coupled to said second tank through said fluid circuit means downstream of said pressure-loss device.

9. A suspension as claimed in claim 8, in which the communication between each said piston chamber and said second tank is controlled, downstream of said pressure-loss device and of the connection of said cavity to said fluid circuit means, by said control valve means which is opened only when the engine of said vehicle is running and is closed in a fluid-tight manner when said engine is stopped.

10. A suspension system as claimed in claim 9, wherein the piston chambers for each wheel suspension system are coupled to said control valve means through respective non-return valves located in said fluid circuit means downstream of said piston chambers to prevent the flow of fluid from the piston chambers of one wheel suspension system to the piston chambers of a second wheel suspension system.

11. A suspension system as claimed in claim 7, further comprising damping means located in said fluid circuit means between said piston chambers and said first tank to restrict the flow of said second fluid from said piston chambers to said first tank.

12. A suspension system as claimed in claim 4, wherein said pump means is coupled to and driven by said engine and said pump means comprises at least as many separate pumping members as there are separate wheel suspension systems on said vehicle.

13. A suspension system as claimed in claim 12, wherein said fluid circuit means includes means coupling the suction side of each separate pumping member to said second tank and means coupling the output of each separate pumping member to said first tank through an interposed, non-return valve.

14. A suspension system as claimed in claim 13, further comprising solenoid operated means coupled to each separate pumping member to shut off the flow of said second fluid from said pumping member to said first tank and corresponding piston chambers when said solenoid operated means is energized.

15. In which said pump means is of the type having pistons with suction and delivery clappers, and in which said solenoid operated means when excited, continuously holds open the suction clapper belonging to a particular piston.

16. A suspension system as claimed in claim 15, wherein said sensing means includes means for detecting the mean position of a wheel of said vehicle relative to said vehicle chassis and for energizing said solenoid-operated means when the detected mean position of a wheel is higher than a preset reference level and for de-energizing said solenoid-operated means when the detected mean position of said wheel is below said reference level.

* * * * *